(12) United States Patent
Drew et al.

(10) Patent No.: US 8,638,207 B2
(45) Date of Patent: Jan. 28, 2014

(54) MODULAR VEHICULAR DIAGNOSTIC TOOL

(75) Inventors: Michael Drew, Dexter, MI (US); Brian Herron, Dexter, MI (US)

(73) Assignee: Drew Technologies, Ann Arbor, MI (US)

(*) Notice: Subject to any disclaimer, the term of this patent is extended or adjusted under 35 U.S.C. 154(b) by 933 days.

(21) Appl. No.: 12/703,943

(22) Filed: Feb. 11, 2010

(65) Prior Publication Data

US 2010/0204878 A1  Aug. 12, 2010

(51) Int. Cl.
*B60Q 1/00* (2006.01)
*B60C 23/00* (2006.01)
*G01M 17/00* (2006.01)
*G06F 7/00* (2006.01)
*G06F 11/30* (2006.01)
*G06F 19/00* (2011.01)
*G07C 5/00* (2006.01)

(52) U.S. Cl.
USPC .......... 340/438; 340/439; 340/445; 701/29.1; 701/29.6; 701/31.4; 701/32.7; 701/34.3

(58) Field of Classification Search
USPC ................. 340/438–456; 701/29–36
See application file for complete search history.

(56) References Cited

U.S. PATENT DOCUMENTS

| | | | | |
|---|---|---|---|---|
| 5,418,836 | A | * | 5/1995 | Yazaki .................. 455/569.2 |
| 5,797,088 | A | * | 8/1998 | Stamegna .................. 455/345 |
| 5,819,201 | A | | 10/1998 | DeGraaf |
| 5,859,628 | A | * | 1/1999 | Ross et al. .................. 345/173 |
| 6,667,726 | B1 | | 12/2003 | Damiani |
| 6,690,268 | B2 | | 2/2004 | Schofield |
| 6,696,922 | B1 | * | 2/2004 | Wong et al. .................. 340/7.32 |
| 6,919,822 | B2 | | 7/2005 | Tanaka |
| 7,012,727 | B2 | | 3/2006 | Hutzel |
| 7,116,216 | B2 | | 10/2006 | Andreasen |
| 7,184,887 | B2 | | 2/2007 | Wood et al. |
| 7,257,468 | B1 | | 8/2007 | Costa |
| 7,286,857 | B1 | * | 10/2007 | Walker et al. .............. 455/569.2 |
| 7,382,237 | B2 | | 6/2008 | Stoschek |
| 7,548,491 | B2 | * | 6/2009 | Macfarlane .................. 367/198 |
| 2002/0025832 | A1 | * | 2/2002 | Durian et al. .................. 455/556 |
| 2002/0049538 | A1 | | 4/2002 | Knapton et al. |
| 2004/0137892 | A1 | * | 7/2004 | Hanood .................. 455/418 |
| 2006/0161713 | A1 | * | 7/2006 | Belady .................. 710/303 |
| 2006/0271246 | A1 | | 11/2006 | Bell et al. |
| 2007/0032950 | A1 | | 2/2007 | O'Flanagan et al. |

(Continued)

*Primary Examiner* — Daniel Wu
*Assistant Examiner* — Emily C Terrell
(74) *Attorney, Agent, or Firm* — Brinks Gilson & Lione (57) ABSTRACT

A vehicle computer interface and software upgrade tool is in the form of a module. A base module contains basic vehicle interface, information and software. Additional modules can be connected to the base module or similar modules to provide a user or technician with the latest interface and software upgrades for vehicles, new vehicle data and new reprogramming features for existing vehicles. This is an expandable system which enables a user of technician to only purchase a relatively small module or component that contains the new interface or information rather than having to repurchase an entire new scan tool or vehicle analyzer. The modules are readily connectable to a vehicle's data port, commonly known as an OBD II connector or port. The modules also include additional connection ports for power in, power out, USB and/or pin connectors which provide for the export of data and other connectors. These modules can also be used in conjunction with an intelligent cable. The intelligent cable has a small computer embedded within the cable to enable sensitive electronic components to be used without cable transmission losses or electrical disturbances.

22 Claims, 11 Drawing Sheets

(56) References Cited

U.S. PATENT DOCUMENTS

| | | | | |
|---|---|---|---|---|
| 2007/0042809 A1* | 2/2007 | Angelhag | ................ | 455/569.1 |
| 2007/0124043 A1 | 5/2007 | Ayoub et al. | | |
| 2007/0185627 A1 | 8/2007 | Mavreas | | |
| 2007/0185631 A1* | 8/2007 | Yeh et al. | ................ | 701/36 |
| 2009/0043446 A1 | 2/2009 | Drew | | |
| 2009/0184812 A1 | 7/2009 | Drew | | |

* cited by examiner

MODULAR VEHICULAR DIAGNOSTIC TOOL

FIELD OF THE INVENTION

The present invention generally relates to an electronic diagnostic device for use in a motor vehicle, and more particularly to an electronic diagnostic device which can be used in conjunction with a vehicle's computer to test and program vehicles. This device can be physically and electronically connected to a similar device which contains updated information regarding vehicles and vehicle performance so that updated information and performance standards can be set to a vehicle's computer.

BACKGROUND OF THE INVENTION

Modern vehicles are generally equipped with numerous sensors, such as, for example, oil pressure, coolant temperature, transmission temperature, engine temperature, steering position, air/fuel ratio, etc. Typically, the sensors are connected to an on-board computer control module that continually monitors the sensors and regulates the vehicles functions accordingly. Generally the information generated by the sensor is continually passed along the vehicle data link as part of the vehicle diagnostic system. The vehicle diagnostic system cooperates with the factory installed gauge cluster to provide failure fault indications to the driver in the form of a "service engine" light. The vehicle diagnostic system typically includes one or more separate computer control modules. Examples of such computer control modules (also known as just "modules") are: a power train control module (PCM), an engine control module (ECM), a transmission control module (TCM), an anti-lock brake system (ABS) control module, and an air bag control module. Typically the computer control modules are connected together by a data link, forming the vehicle diagnostic system. The data link typically has a connection point, or data link connector (DLC) that is normally located under the dash of the vehicle. The vehicle diagnostic system is generally used to provide relevant information to repair technicians. The DLC provides repair technicians with a place to connect off-board vehicle diagnostic devices, such as scan tools and code readers for communication with the vehicle diagnostic system.

Typically, scan tools are capable of performing at least some of the following major functions: "View Data," also known as "Live Data," "Data," and "Data Test, DTC" (viewing and displaying in real-time live changing data from a plurality of module sensors), display of textual diagnosis descriptions corresponding to the various diagnostic codes, recording and playback of data, device control (manually controlling modules for diagnostic purposes), and reading and displaying vehicle information from the vehicle's computer (e.g., VIN information, controller calibration identification number, etc.).

DESCRIPTION OF THE PRIOR ART

"Off-board devices," such as scan tools and code readers are known in the art. Scan tool and code reader testing devices interface with vehicle diagnostic systems to access, display, and/or print vehicle diagnostic information. On-Board Diagnostics Version II (OBD II) Scan Tools are one commonly known type of scan tool and are governed by a number of standards, e.g., SAE J1978 Rev. 1998-02, SAE J1979 Rev. 1997-09, ISO9141/KWP2000, CAN/IS015765, SAE J1850 PWM, SAE J1850 VPW or the like.

A "Manufacturer-Specific Scan Tool" is a scan tool that accesses and displays proprietary manufacturer-specific data (and possibly also additionally accesses and displays OBD II data). Examples of proprietary manufacturer-specific data include Device Controls on General Motors, On-Demand Tests in Ford, Actuator Tests, Sensor Tests, Interrogator, and Read Temporary Codes in Chrysler. In general, air bag data, ABS data, cruise control data, and climate control data are also considered to be proprietary manufacturer-specific data and are typically included only in Manufacturer-Specific Scan Tools.

Technicians at automobile dealerships and repair shops now days need the ability to reprogram the software contained in the vehicle's onboard computer. These reprogramming requirements normally reflect changes recommended by the automobile manufacturer. Software changes can also be utilized to improve a vehicle's performance. Reprogramming was initially adopted by the aftermarket in 2002 when the Society of Automotive Engineers SAE standard J2534 was published. In 2004 this standard was modified to J2534-1 thus technicians and customers had to purchase new hardware to use this new standard.

In 2005 a new standard J2534-2 was published permitting technicians and customers to communicate with, diagnose and reprogram vehicle computers. The J2534-2 standard has been changed several times since its inception in 2005. With each change the technician and customer had to purchase new hardware to utilize the new updated standard. These changes were driven by new automobiles that require new technology and adding support for older vehicles. The J2534-2 standard is designed to be a "living" standard, which implies that it will be constantly changing and evolving over time. New hardware may be required with each new change or upgrade of the standard. This is very costly to the technician and customer.

These scan tools can be upgraded to diagnose new vehicles by the use of cartridges. In the case where a vehicle requires a new hardware interface these scan tools can not be upgraded. These cartridges are connectable to the scan tool and provide the technician with the latest data for the new vehicles. However, these cartridges do not permit the scan tools to be used where there are different interfaces. The present invention comprises modules which contain hardware and software that is upgradeable over the Internet and does not required the purchase of new cartridges. The present invention can add on modules which can provide new features such as fiber-optic connections which would operate with fiber optic networks in vehicles. The new modules permit the hardware interfaces to be updated. All of these new features are combined with the ability to utilize the existing modules to connect to older vehicles without the need for special cables of data cartridges.

SUMMARY OF THE INVENTION

Briefly, the present invention is a vehicle computer interface and upgrade tool in the form of a module. A base module contains basic vehicle interface and software. Additional modules can be connected to the base module or similar modules to provide a user or technician with the latest software updates for vehicles, new vehicle interfaces and new reprogramming features for existing vehicles. The present invention is an expandable system which enables a user of technician to only purchase a relatively small module or component that contains the new interface and information rather than having to repurchase an entire new scan tool or vehicle analyzer. The present invention comprises modules which contain hardware and software that is upgradeable over the Internet and does not require the purchase of new cartridges. The present invention can add on modules which can provide new features such as fiber-optic connections which would operate with fiber optic networks in vehicles. The modules are readily connectable to a vehicle's data port, commonly known as an OBD II connector or port. The modules also include additional connection ports for power in, power out, USB and/or pin connectors which provide for the export of data and other connectors. These modules can also be used in conjunction with an intelligent cable. The intelligent cable has a small computer embedded within the cable to enable sensitive electronic components to be used without cable transmission losses or electrical disturbances. While the add-on modules permit connections to newer vehicles, the older modules retain their connections for older vehicles. As a result no new or special connections are required with the present invention.

Accordingly, it is an objective of the instant invention to provide a vehicle diagnostic tool which is readily upgradeable.

It is a further objective of the instant invention to provide a vehicle diagnostic tool, such as a J2543 device, which comprises a plurality of modules or components which that are readily connectable to each other to provide a user or technician with the latest vehicle upgrades, vehicle interfaces, or software updates including information.

It is yet another objective of the instant invention to provide a vehicle diagnostic tool which comprises a plurality of modules or components which enable a user or technician to reprogram vehicles.

It is a still further objective of the invention to provide a vehicle diagnostic tool which comprises a plurality of modules or components that enable a new module to modify a previous module to enable the combinations of modules to operate on or communicate with vehicles that the previous modules were not capable of operating on or communication with.

It is still yet a further objective of the invention to provide an intelligent cable to be used in conjunction with the modules. The intelligent cable has a small computer embedded within the cable to enable sensitive electronic components to be used without cable transmission losses or electrical disturbances.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 1:
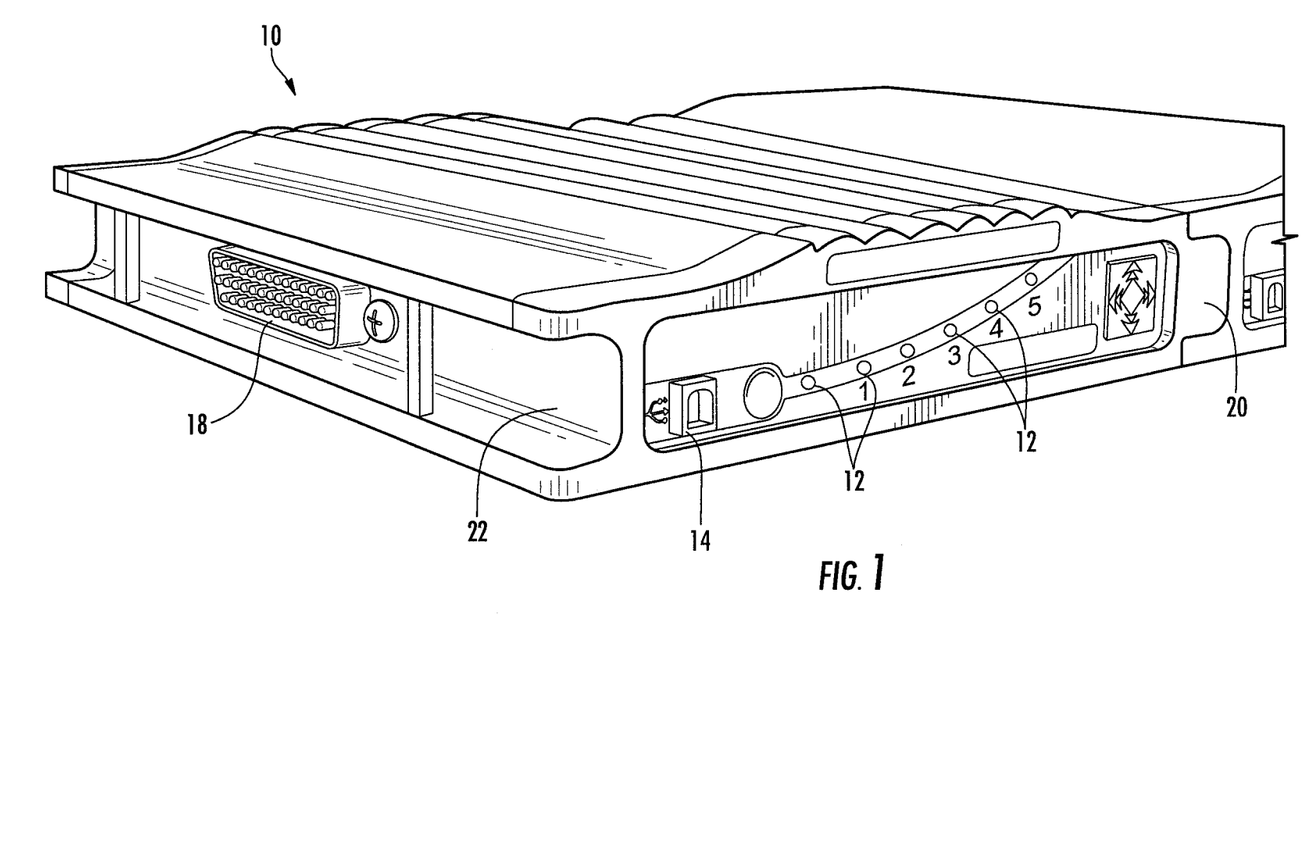
FIG. 1 is a front perspective view of a module of a first embodiment of the present invention.
Figure 2:
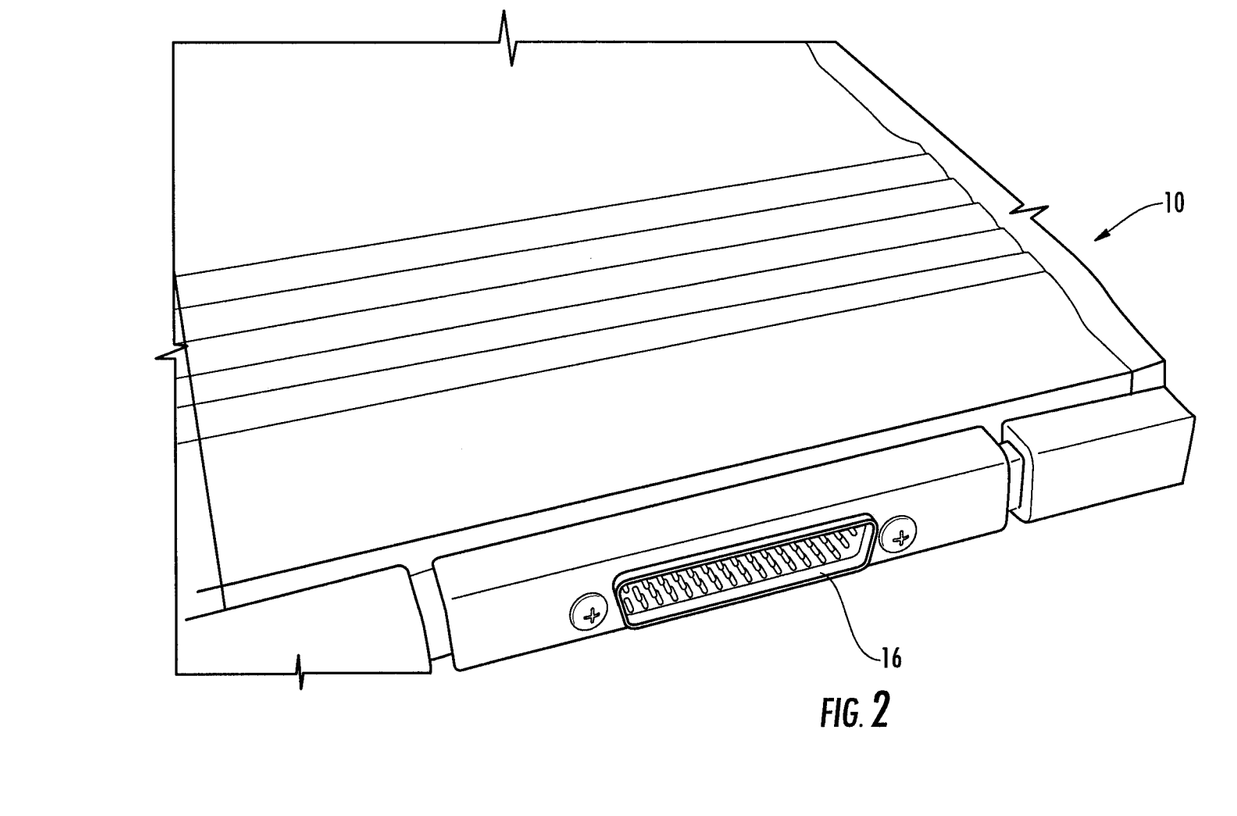
FIG. 2 is a right side view of the first embodiment illustrated in FIG. 1.
Figure 3:
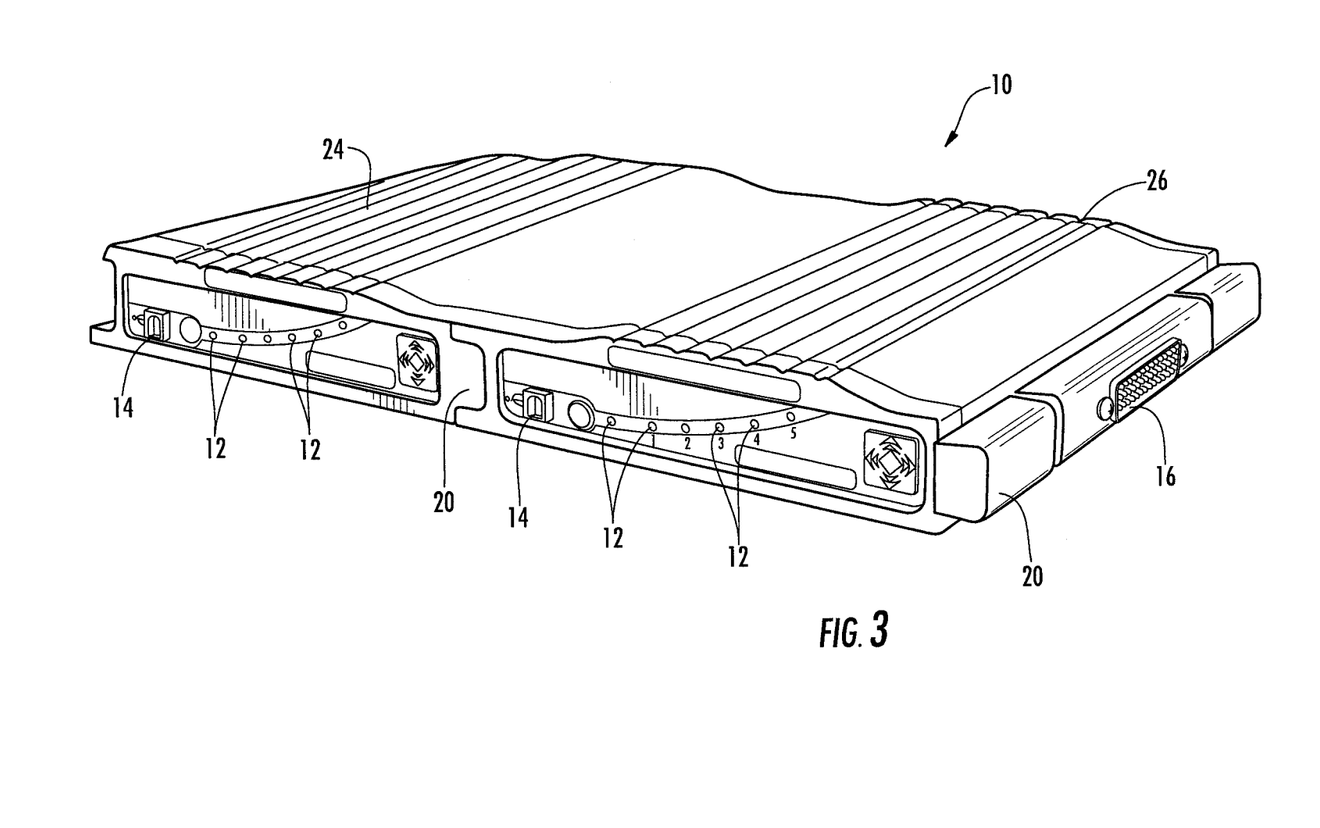
FIG. 3 is a front perspective view of two modules, illustrated in FIG. 1, of the present invention connected to each other.

Referring now to FIGS. 1-17 the present invention will now be described. A first embodiment of a module, diagnostic or re-flashing tool 10 is illustrated in FIGS. 1-3. In FIG. 1 a front portion of the tool includes a plurality of light emitting diodes (LED) 12 which can indicate the status of specific conditions of the module or of a vehicle. A USB connector 14 is also positioned on the front of the tool 10. The USB connector enables the tool to communicate with other devices such as lap top computers and other diagnostic tools or modules. This data can be utilized to analyze one or more problems with the vehicle. Data can also be uploaded into the vehicle utilizing the laptop computer. The LEDs can be used to indicate the condition of the upload of data or the module. These modules 10 are provided with a multi-pin connector 16 (FIG. 2) which is electrically connected to a multi-pin receptacle 18 (FIG. 1). The connection of 16 and 18 enable the tools or modules which are connected to each other to communicate with each other.

FIG. 3 illustrates two tools or modules connected to each other. A port, such as a 16 pin connector, (not shown) enables these modules to be connected to a data port of a vehicle, such as an OBD II port. Other connectors can be provided which would enable these modules to be connected to various other data output ports of vehicles. The right side of each module 10 is shaped as a projection 20. The left side of each module 10 is shaped as a receptacle 22. When the modules are assembled the projection 20 is placed into the receptacle 22. This provides a positive physical connection between adjacent modules 10. The projection 20 and receptacle 22 can be reversed to opposite sides of the modules 10 is desired. As illustrated in FIGS. 1 and 3 the projection 20 includes a multi-pin connector 16 and the receptacle 22 includes a multi-pin receptacle 18. The connector 16 and receptacle 18 can also be reversed to opposite sides.

In FIG. 3 an example of plural modules 10 connected together to form the present invention is illustrated. The module 24 on the left can be a base module which contains basic interface and information for vehicles. The module 26 on the right can be the new add-on or expandable module. This module will contain new interfaces, updated data for vehicles and/or software to enable modifications of the performance of vehicles. Another module (not shown) could be connected to the right side of module 26. This module would contain further interfaces and updates of data for vehicles. This data can then be entered into a vehicle's computer to update the software in the computer. This is known as "flashing" the computer in the automotive art. As certain software update become available from a vehicle manufacturer, they can communicate thru these modules so that the latest vehicle information and the latest software updates are installed into a vehicle's computer via the present invention. Each module includes a hardware added so that each module can differentiate itself from other modules.

Figure 4:
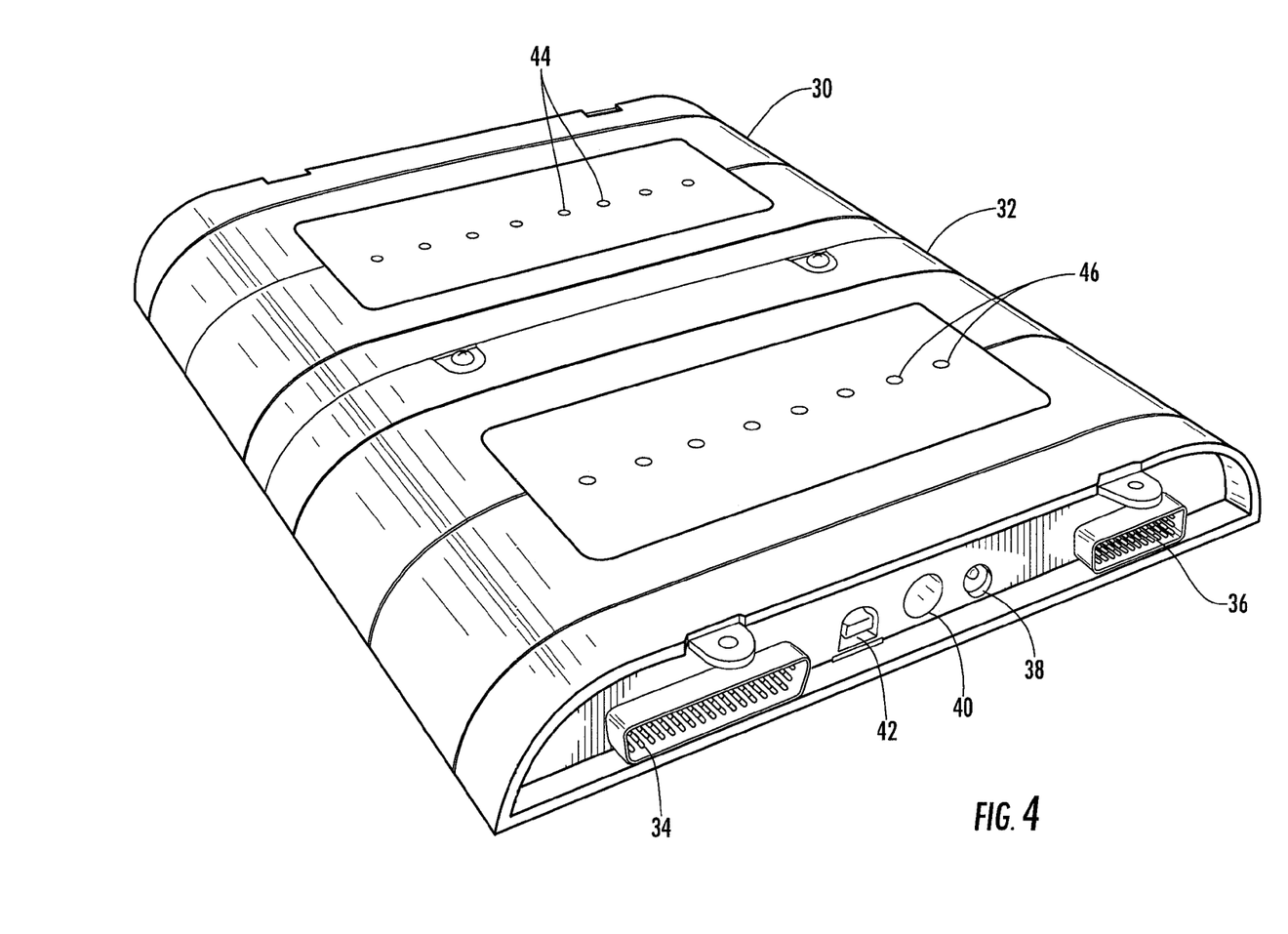
FIG. 4 is a front perspective view of two modules of a second embodiment of the present invention connected together.

FIG. 4 illustrates a second embodiment of the present invention. A module 30 is connected to a module 32 in a manner similar to how modules 24 and 26 are connected to each other. Module 30 can be a basic module and module 32 can be an add-on module. Pin connector 34 enables the individual modules to be connected to each other. A port 36 in the form of a 16 pin connector provides a connection for a cable to connect the modules to a vehicle. For example, a cable can be connected to port 36 and the OBD output port on a vehicle. The modules can include an input/out board. The input/outboard being constructed and arranged to be connected to devices such as thermocouples, analogue inputs, digital inputs/outputs.

Connection 38 is an input for power. This input can be connected to a low voltage source and provides power to the modules and/or the vehicle. Some diagnostic tests and software upgrades require power to be supplied to the vehicle. Connection 40 is an output for power. This can be connected to a vehicle or another device which could be used in conjunction with the modules for diagnostic tests or to provide software upgrades to a vehicle. Connection 42 is a USB port. This can be used to connect the modules to other devices such as computers. For example a wire can be connected to USB port 42 and a personal computer such as a laptop computer. This enables information to be transferred between the modules and a personal computer. For example, a software upgrade for a vehicle could be downloaded from a vehicle manufacture's Website to the laptop computer over the Internet. This upgrade could then be transferred from the laptop to the vehicle via a connection wire and the modules 30, 32. This information is based on the J2534-1 and J2534-2 SAE standard referred to above. In addition, a compact disk (CD) or other types of media could be supplied to a vehicle owner or service repair facility from a vehicle manufacturer with updated information and software for vehicles. These media can then be connected to the laptop computer and the updated information transferred to the vehicle via the modules of the present invention.

A plurality of LEDs 44 and 46 are located on the top of modules 30 and 32 respectively. These LEDs are used in conjunction with diagnostic tests and software upgrades. In place of the LEDs, a display screen could be utilized. This screen would display information regarding the diagnostic tests and software upgrades. The screen can also be a touch screen which enables input to the modules from the screen.

Figure 5:
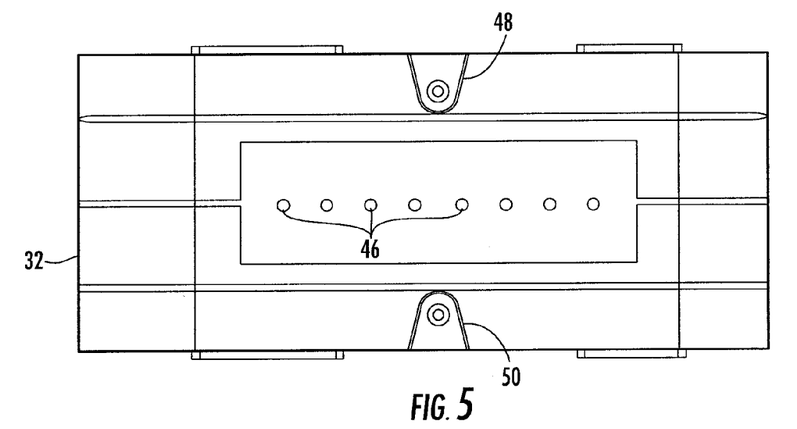
FIG. 5 is a top view of a single module of a second embodiment of the present invention.
Figure 6:
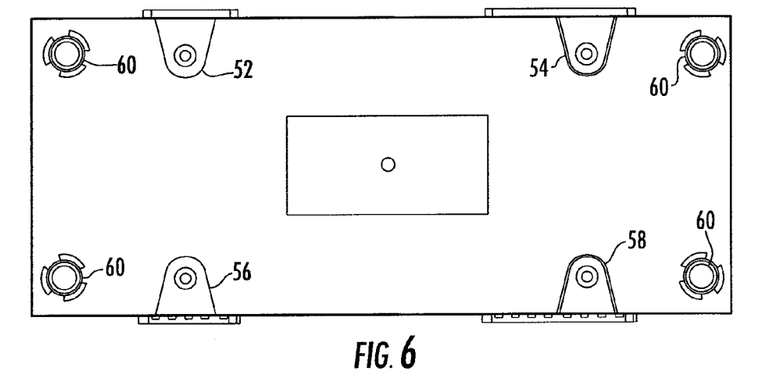
FIG. 6 is a bottom view of a single module of a second embodiment of the present invention.
Figure 7:
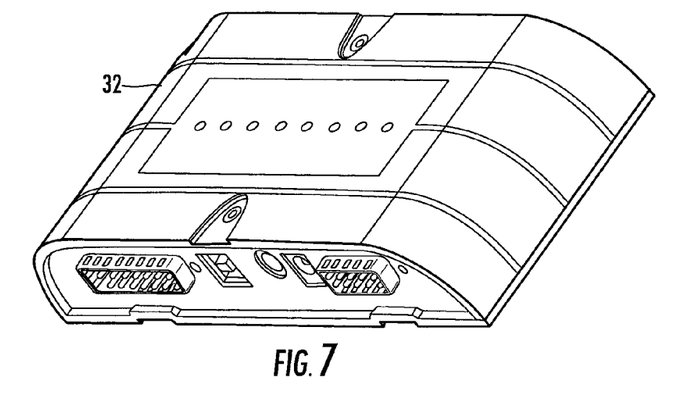
FIG. 7 is a top perspective view of a single module of a second embodiment of the present invention.

FIGS. 5-7 illustrate a single module, 32 for example. FIG. 5 illustrates a top view of the module including LEDs 46. Securing members 48, 50 are illustrated on either side of the module. When two modules are placed adjacent each other securing members 48 and 50 cooperate with fasteners, 51 (FIGS. 8 and 9) to help secure the modules to one another.

FIG. 6 illustrates the bottom of a module 32. The bottom includes securing members 52, 54, 56 and 58. These securing members are similar to the securing members 48, 50 on the top of the module. They function in the same manner to help secure modules to each other. Elements 60 are secured to the bottom of module 32. These elements function as feet to both support the module 32 in a spaced relationship from a surface and to provide an element which prevents the modules from slipping or moving along a surface.

Figure 8:
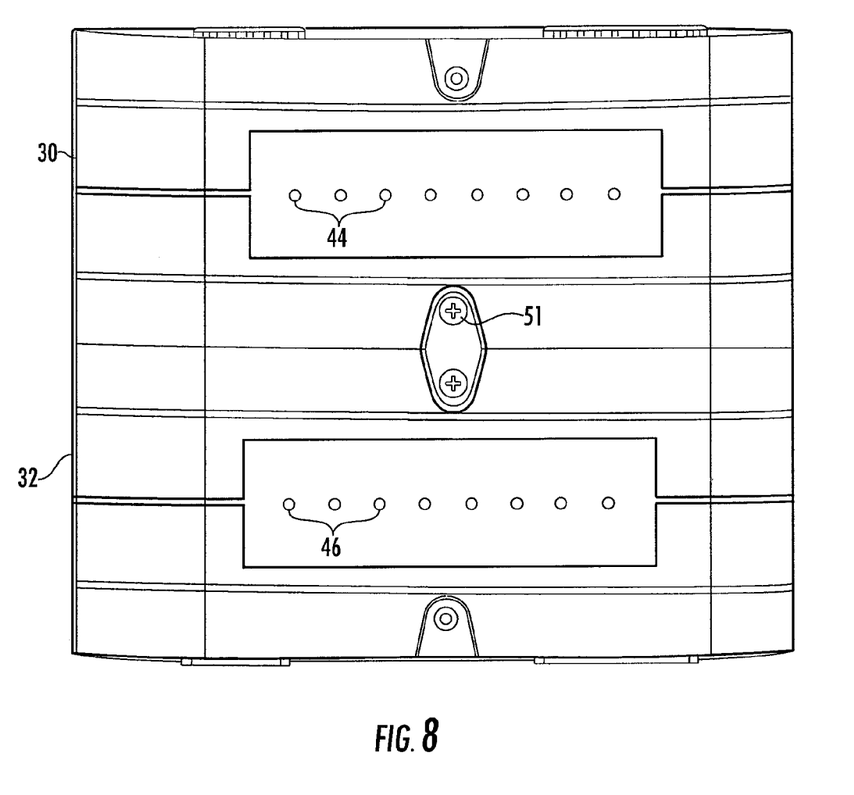
FIG. 8 is a top view of two modules of a second embodiment of the present invention connected together.

FIG. 8 is a top view of two modules secured to each other. Fastener 51 is placed in securing members 48 and 50 to secure the top surfaces of the modules together.

Figure 9:
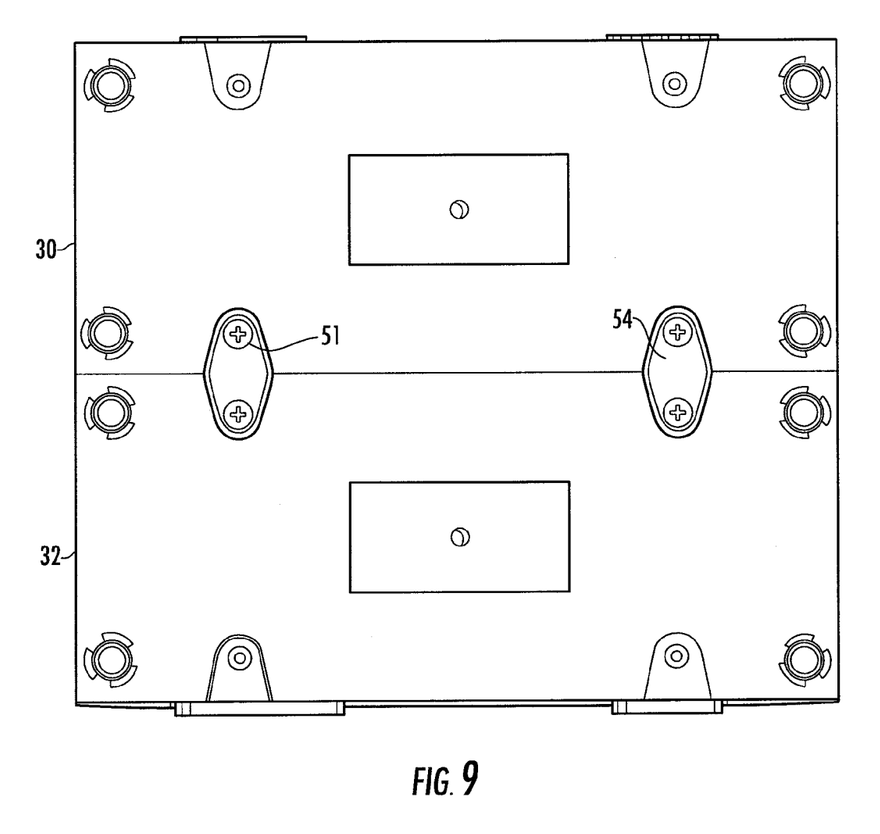
FIG. 9 is a bottom view of two modules of a second embodiment of the present invention connected together.

FIG. 9 is a bottom view of two modules secured to each other. Fasteners 51 are placed in securing members 52, 56 and 54, 58 to secure the bottom surfaces of the modules together.

Figure 10:
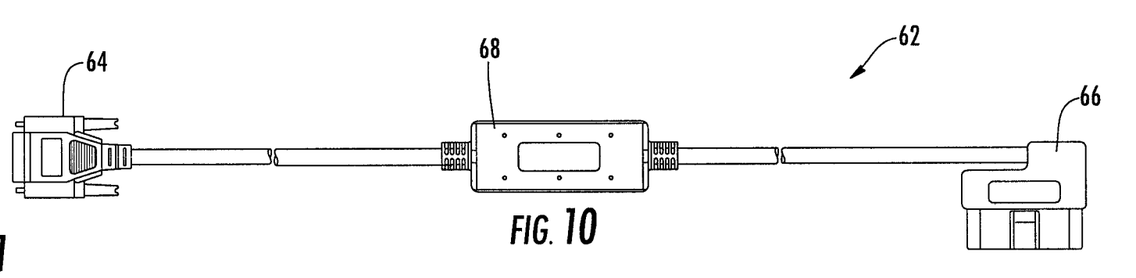
FIG. 10 is a view of an intelligent cable.
Figure 11:
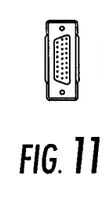
FIG. 11 is an end view of a connector on one end of the intelligent cable in FIG. 10.
Figure 12:
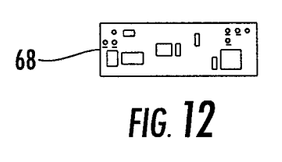
FIG. 12 is a bottom view of the computer wired into the intelligent cable illustrated in FIG. 10.
Figure 13:
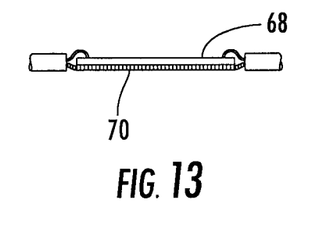
FIG. 13 is a side view of the plastic overmold of the computer illustrated in FIG. 10.
Figure 14:
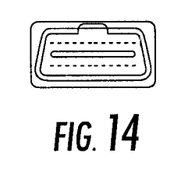
FIG. 14 is an end view of another connector on another end of the intelligent cable.

FIG. 10 is a view of an intelligent cable 62 which may be utilized in conjunction with the modules. The intelligent cable 62 includes a connector 64 at one end and a connector 66 at another end. A computer 68 is connected or wired into the cable 62. Connector 66 is preferably a J1962 cable end. This connector can be readily connected to an output of a vehicle such as an OBD II connection. The opposite end of cable 62 has a connector 64 which can be secured to one of the modules of the present invention.

The computer 68 is preferably secured to the cable with heat shrink tubing 70. Other methods and means to secure the computer to the cable can also be employed. The computer 68 can be controlled by the modules 30, 32 and enables sensitive electronic instruments to be placed at the end 64 of the cable without being subject to cable transmission losses and/or electrical disturbances. These electronic instruments are normally utilized in conjunction with the modules 30, 32.

Figure 15:
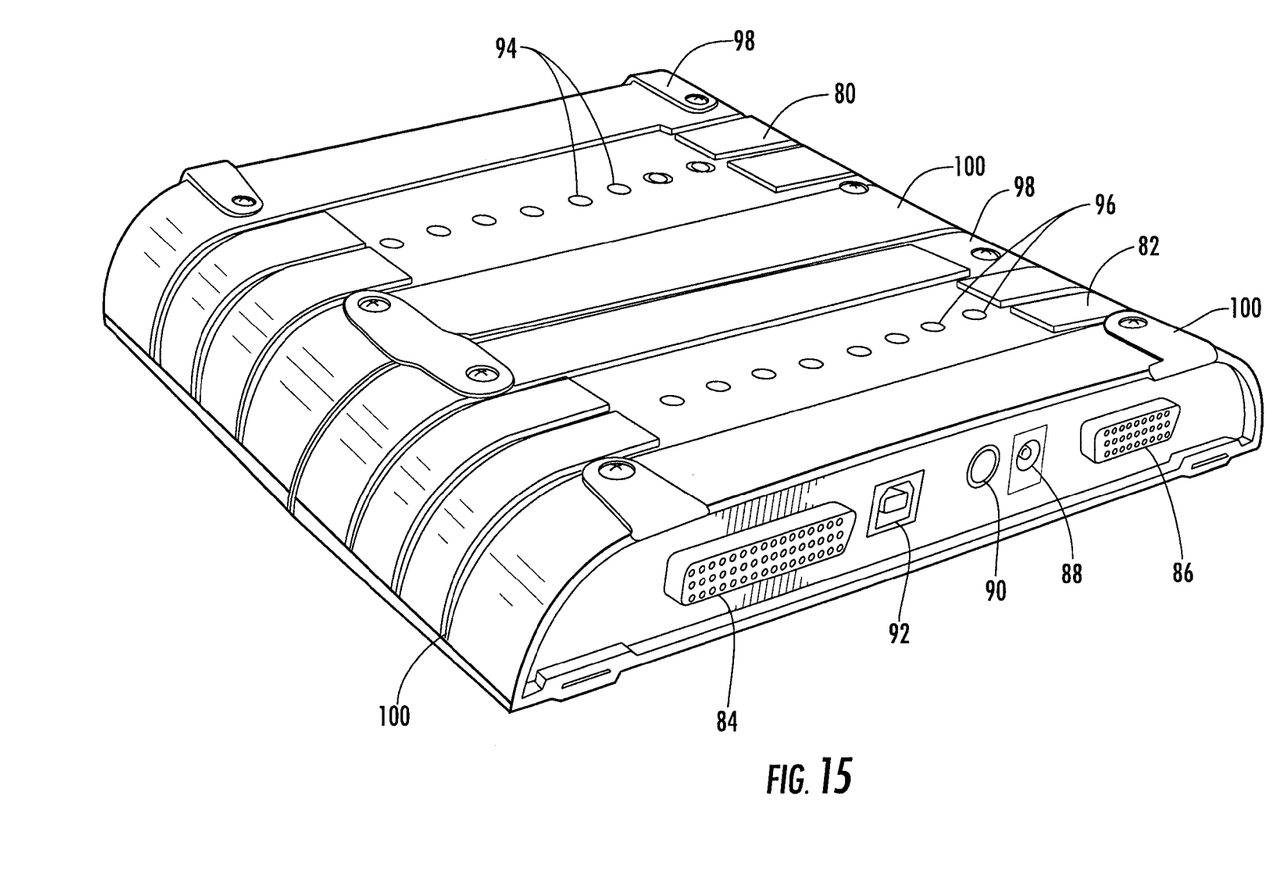
FIG. 15 is a front perspective view of two modules of a third embodiment of the present invention connected together.

FIG. 15 illustrates a second embodiment of the present invention. A module 80 is connected to a module 82 in a manner similar to how modules 24 and 26 are connected to each other. Module 80 can be a basic module and module 82 can be an add-on module. Pin connector 84 enables the individual modules to be connected to each other. A port 86 in the form of a 16 pin connector provides a connection for a cable to connect the modules to a vehicle. For example, a cable can be connected to port 86 and the OBD output port on a vehicle.

Connection 88 is an input for power. This input can be connected to a low voltage source and provides power to the modules and/or the vehicle. Some diagnostic tests and software upgrades for the vehicle require power to be supplied to the vehicle. Connection 90 is an output for power. This can be connected to a vehicle or another device which could be used in conjunction with the modules for diagnostic tests or to provide software upgrades to a vehicle. Connection 92 is a USB port. This can be used to connect the modules to other devices such as computers. For example a wire can be connected to USB port 92 and a personal computer such as a laptop computer. This enables information to be transferred between the modules and a personal computer. For example, a software upgrade could be downloaded from a vehicle manufacture's Website to the laptop computer over the Internet. This upgrade could then be transferred from the laptop to the vehicle via a connection wire and the modules 80, 82. This information is based on the J2534-1 and J2534-2 SAE standard referred to above. In addition, a compact disk (CD) or other types of media could be supplied to a vehicle owner or service repair facility from a vehicle manufacturer with updated information and software for vehicles. These media can then be connected to the laptop computer and the updated information transferred to the vehicle via the modules of the present invention.

A plurality of LEDs 94 and 96 are located on the top of modules 80 and 82 respectively. These LEDs are used in conjunction with diagnostic tests and software upgrades. In place of the LEDs, a display screen could be utilized. This screen would display information regarding the diagnostic tests and software upgrades. The screen can also be a touch screen which enables input to the modules from the screen.

Figure 16:
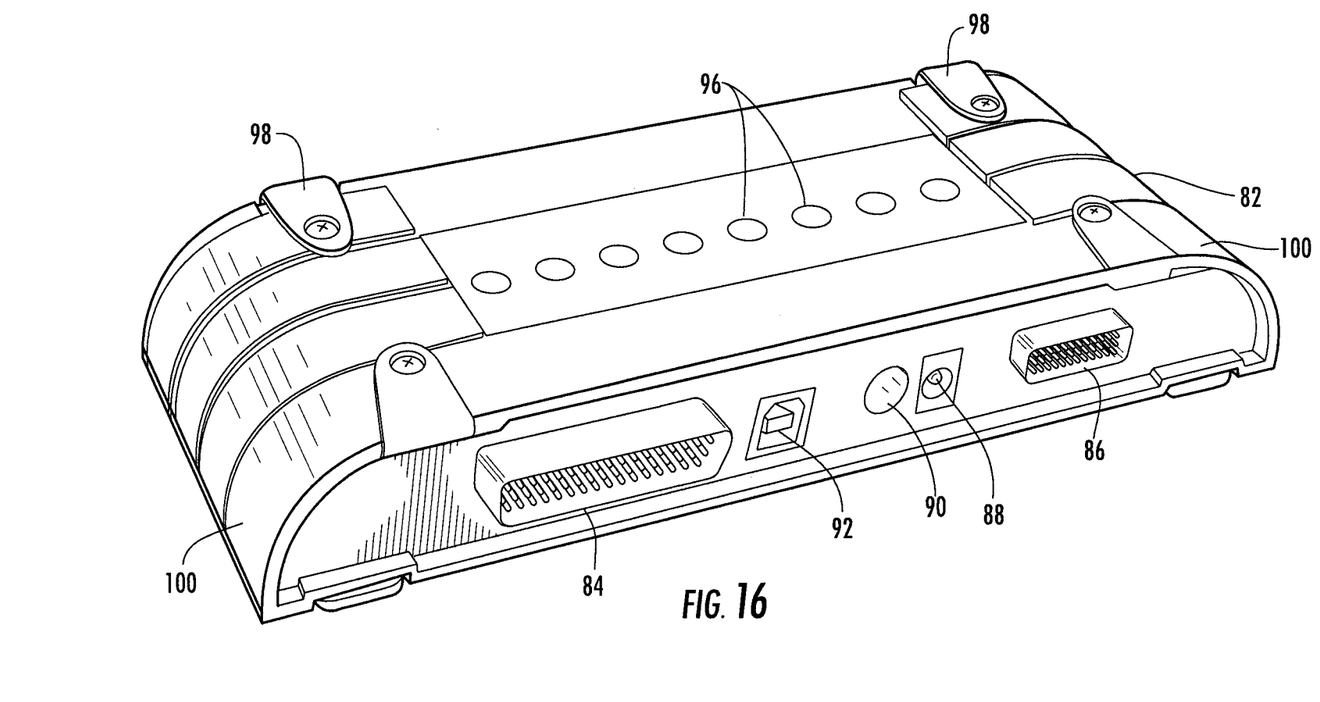
FIG. 16 is a top perspective view of a single module of a third embodiment of the present invention illustrating one end with multiple connectors.
Figure 17:
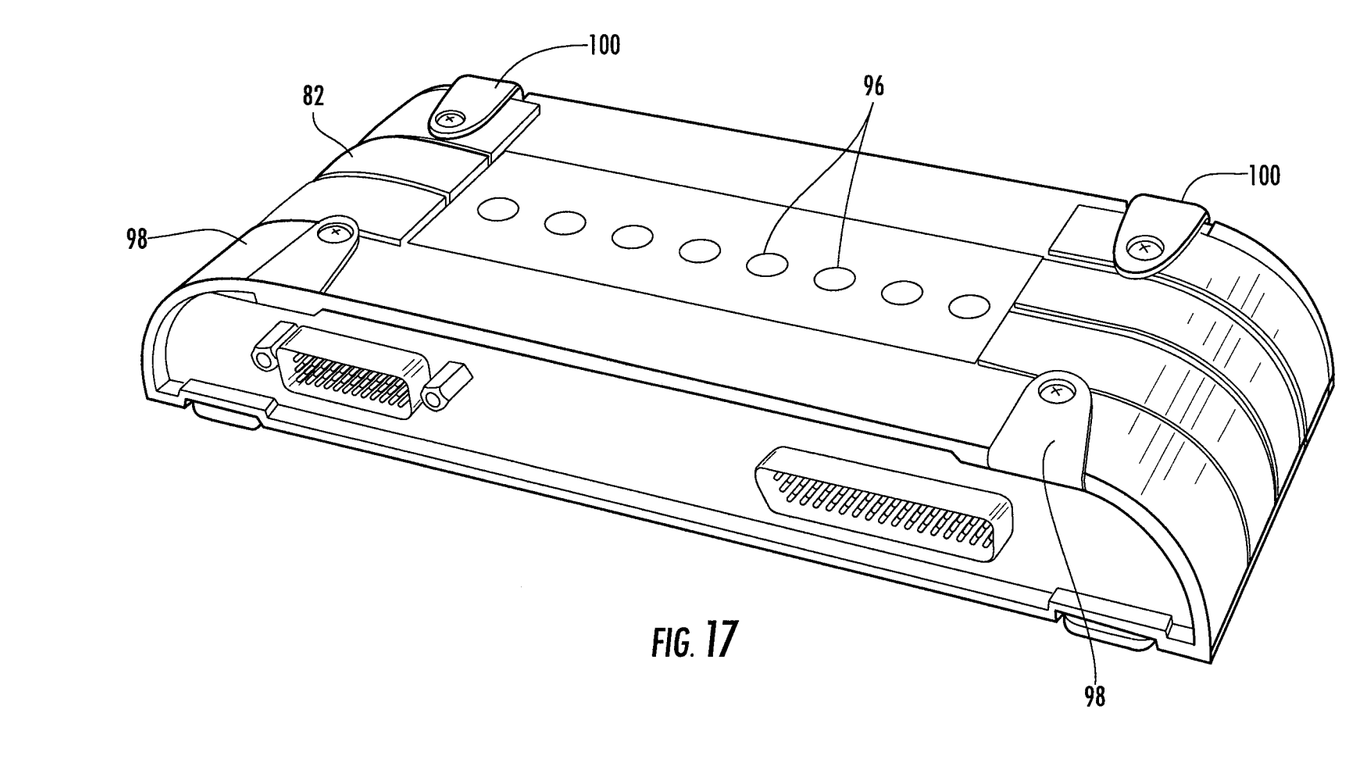
FIG. 17 is a top perspective view of a single module of a third embodiment of the present invention illustrating the opposite end of the module in FIG. 16.

FIGS. 16 and 17 illustrate a single module of the third embodiment, 82 for example. FIG. 16 illustrates a top view of the module including LEDs 96. Securing members 98, 100 are illustrated on either side of the module. When two modules are placed adjacent each other securing members 98 and 100 cooperate with fasteners, not shown, to help secure the modules to one another.

A preferred embodiment of the present invention includes a base J2534-1 module. This module has an interface which contains one controller area network (CAN) controller only able to connect to pins 6 and 14; one J1859PWM network controller; one J1850VPW network controller; one ISO K-Line controller connected only to pin 7; one ISO L-Line controller connected only to pin 15; Chrysler SCI controller; programmable power supply for pins 6, 9, 11, 12, 13 and 14 and a short to GND on pin 15.

Some vehicle manufactures have multiple CAN networks on a vehicle. These networks can not be reached using a J2534-1 module due to the fact that they are on pins other than 6 and 14 on the J1962/DLC connector. A J2534-2 module permits a CAN network to be on any pins except 4, 5 and 16 (ground and power). Building one device which supports all the needs of all of the vehicle manufactures is very expensive and impractical as the vehicle requirements keep changing. It should also be noted that not all service technicians service all makes of vehicles and therefore would not need a device that could service all possible makes of vehicles. For example, if a GM vehicle needs four CAN networks today, a Ford technician, who only needs two CAN networks today would have to carry the cost of two additional CAN controllers that they may never use. Also if a diagnostic tool were built today with four CAN channels, what would the technician do if GM added a fifth CAN channel?

Another module of the present invention is referred to as the Mega K-Line module. In Europe many original equipment manufactures have the K-Line on pins other than pin 7. The J2534-1 module only allows K-Line on pin 7. To reach the other pins other pins, the Mega K-Line module and another independent K-Line controller allows access to a K-Line on any pin except 4, 5 and 16. A technician in Europe may find the a base J2534-1 module and a Mega K-Line module are all that are currently required to service the vehicles that they specialize in servicing. At a later date, if additional CAN channels are required they can add one or more Mega-Can modules. Likewise if they need more K-Line controllers they can add additional mega K-Line modules.

The present invention allows the technician to buy the base J2534-1 module and then add as many Mega-CAN modules as they need to service the vehicles they wish to service. If at a latter time they want to service other makes of vehicles, for example a Ford technician wanting to service a GM vehicle, they simply buy and attach two more Mega-CAN modules. This allows the technician to buy only what they need and also gives them the flexibility to expand in the future. Other diagnostic tool manufactures have built expandable systems but they required that the system housing be opened and a new card be installed. In the past the number of cards available to the technician was limited and they may have had to send the diagnostic unit back to the manufacturer to have the unit expanded.

The present invention J2534-2 module adds the most frequently used of the currently defined J2534-2 options. It allows the technician to work on older Honda and GM vehicles as well as allowing access to systems like ABS and other body control modules not accessible from the J2534-1 module. The present invention is unique in that it allows the technician to add or subtract modules any time they want without doing anything more than attaching the new module to the existing modules in the same manner that Legos® are attached to each other. There is no user configuration, no jumpers to set and the housing does not need to be opened. It is just "plug and play".

The J2534-1 module is capable of being both a master controller (head of the chain) and a slave. This is important because it leaves the door open for more powerful "master" modules with different PC interfaces. While the preferred J2534-1 module connects to a PC via a USB connection other connections are also possible such as wired Ethernet, wireless Ethernet, Bluetooth and cellular modem. These can also be used in combination with each other.

While the preferred embodiment of the J2534-1 master module needs to be connected to a PC to be useful, other embodiments can function without connection to a PC. These may include intelligent master modules with removable storage in the form of SD cards, CF cards, USB flash drives and other options. Master modules may also include color touch screens and the like to allow the user to interact with the device without having a PC present.

The present invention includes architecture which includes dual high speed communication buses and an automatic module numbering and identification system that allows for the "plug and play" operation. Each module is assigned a unique when powered up. The order in which the modules are connected does not matter. The present invention configures itself without user intervention. The order of module connection can be changed without affecting the functionality of the modules.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A data acquisition, diagnostic and programming system for displaying operator configurable information relating to a vehicle comprising:
   at least two structurally similar modules constructed and arranged to be in communication with a vehicle, at least one of the two structurally similar modules including a device constructed and arranged to obtain information relating to the operation of said vehicle;
   a data link extending between said vehicle and said at least one module, said data link providing bi-directional communication between said at least one module and said vehicle, said at least one module containing software constructed and arranged to evaluate the operating parameters of said vehicle, communicate with said vehicle and update the operating parameters of said vehicle; and
   wherein the two structurally similar modules further comprise a first side and a second side of each module, the first side and second side being generally opposite to each other, the first side is shaped as a receptacle, the second side is shaped as a projection, wherein the projection of one module is configured to mate with the receptacle of the other module.

2. The data acquisition and programming system of claim 1 including another said module, said modules being in communication with each other and with said vehicle.

3. The data acquisition and programming system of claim 2 wherein said another module containing new interfaces and the most recent software updates and vehicle parameters communicates with said vehicle through said at least one module.

4. The data acquisition and programming system of claim 2 wherein a plurality of said modules are in communication with each other in series, said another module containing new interfaces and the most recent software updates and most recent vehicle parameters is in communication with said vehicle through said least one module.

5. The data acquisition and programming system of claim 1 wherein said at least one module includes an input for a direct current power source.

6. The data acquisition and programming system of claim 1 wherein said at least one module includes an output constructed and arranged to provide power to said vehicle.

7. The data acquisition and programming system of claim 1 including a data port enabling bi-directional communication between said at least one module and a personal computer.

8. The data acquisition and programming system of claim 1 wherein said at least one module includes light emitting diodes (LEDs) which indicate the operating parameters of said vehicle.

9. The data acquisition and programming system of claim 1 wherein said at least one module includes a video display screen.

10. The data acquisition and programming system of claim 9 wherein said video display screen is a touch screen enabling input form an operator.

11. The data acquisition and programming system of claim 2 including a data link connector connected to said vehicle and said at least one module, said data link enables bi-directional communication between said vehicle and said at least one module.

12. The data acquisition and programming system of claim 2 including connectors n each of said modules, said connectors providing communication between said modules and said vehicle.

13. The data acquisition and programming system of claim 11 wherein said data link includes a computer, said data link computer constructed and arranged to enable enhanced communication between said at least one module and said vehicle, said data link computer constructed and arranged to prevent data link cable transmission losses and electrical disturbances between said vehicle and a vehicle parameter sensing device.

14. The data acquisition and programming system of claim 7 wherein said personal computer is in communication with a web site of a vehicle manufacturer, updated vehicle information is downloaded form said vehicle manufacturer website to said personal computer, said updated information is transmitted to said at least one module, said updated information is then transmitted from said at least one module to said vehicle.

15. The data acquisition and programming system of claim 2 wherein each of said modules include a forward end and a rearward end, said modules being connected to each other such that said forward end of one of said modules is connected to said rearward end of another of said modules.

16. The data acquisition and programming system of claim 2 wherein each of said modules include support feet positioned on a top surface and on a bottom surface of each of said modules, said feet being removable and replaceable with securing devices, said securing devices constructed and arranged to secure said modules to each other.

17. The data acquisition and programming system of claim 2 including an input/out board, said input/outboard constructed and arranged to be connected to at least one of thermocouples, analogue inputs, and digital inputs/outputs.

18. A method of data acquisition and programming for displaying operator configurable information relating to a vehicle comprising the steps of:
   providing at least two structurally similar modules, wherein at least one of the two structurally similar modules is constructed and arranged to be in communication with a vehicle, said modules including a device constructed and arranged to display information relating to the operation of said vehicle;
   providing a data link extending between said vehicle and said at least one module, said data link providing bi-directional communication between said at least one module and said vehicle, said at least one module containing software constructed and arranged to evaluate the operating parameters of said vehicle, communicate with said vehicle and update the operating parameters of said vehicle and
   wherein the at least two structurally similar modules further comprise a first side and a second side of each module, the first side and second side being generally opposite to each other, the first side is shaped as a receptacle, the second side is shaped as a projection, wherein the projection of one module is configured to mate with the receptacle of the other module.

19. The method of data acquisition and programming for displaying operator configurable information of claim 18 including providing a plurality of said modules in communication with each other in series, said module containing the most recent software updates and most recent vehicle parameters being in communication with said vehicle through said other modules.

20. The method of data acquisition and programming for displaying operator configurable information of claim 18 including providing a data link connector connected to said vehicle and said at least one module, said data link enabling b-directional communication between said vehicle and said at least one module.

21. The method of data acquisition and programming for displaying operator configurable information of claim 20 wherein said data link includes a computer, said data link computer enabling enhanced communication between said at least one module and said vehicle, said data link computer preventing data link cable transmission losses and electrical disturbances between said vehicle and a vehicle parameter sensing device.

22. The method of data acquisition and programming for displaying operator configurable information of claim 21 including providing connectors on each of said modules, said connectors providing communication between said modules and said vehicle.

* * * * *